US010415507B2

(12) United States Patent
Hue et al.

(10) Patent No.: US 10,415,507 B2
(45) Date of Patent: Sep. 17, 2019

(54) METHOD OF REGULATING THE PRESSURE WITHIN A FIRST ROCKET ENGINE PROPELLANT TANK

(71) Applicant: AIRBUS SAFRAN LAUNCHERS SAS, Issy-les-Moulineaux (FR)

(72) Inventors: Valentin Hue, Vernon (FR); Serge Le Gonidec, Vernon (FR)

(73) Assignee: ARIANEGROUP SAS, Paris (FR)

( * ) Notice: Subject to any disclaimer, the term of this patent is extended or adjusted under 35 U.S.C. 154(b) by 360 days.

(21) Appl. No.: 15/333,339

(22) Filed: Oct. 25, 2016

(65) Prior Publication Data

US 2017/0114753 A1  Apr. 27, 2017

(30) Foreign Application Priority Data

Oct. 26, 2015  (FR) ...................................... 15 02259

(51) Int. Cl.
*F02K 9/56* (2006.01)
*F02K 9/50* (2006.01)
(Continued)

(52) U.S. Cl.
CPC .............. *F02K 9/563* (2013.01); *B64G 1/401* (2013.01); *B64G 1/402* (2013.01); *F02K 9/42* (2013.01);
(Continued)

(58) Field of Classification Search
CPC ... F02K 9/42; F02K 9/425; F02K 9/44; F02K 9/46; F02K 9/48; F02K 9/50; F02K 9/563; B64G 1/401; B64G 1/402
See application file for complete search history.

(56) References Cited

U.S. PATENT DOCUMENTS

| 2,683,963 A | 7/1954 | Chandler |
| 5,648,052 A * | 7/1997 | Schaefer ..................... B01J 7/02 |
| | | 280/736 |

(Continued)

FOREIGN PATENT DOCUMENTS

| EP | 1 241 341 A1 | 9/2002 |
| WO | WO 2015/019000 A1 | 2/2015 |

OTHER PUBLICATIONS

French Search Report dated Jul. 28, 2016, in corresponding French Patent Application No. 1502259 (2 pages).

*Primary Examiner* — William H Rodriguez
*Assistant Examiner* — Kyle Robert Thomas
(74) *Attorney, Agent, or Firm* — Bookoff McAndrews, PLLC

(57) ABSTRACT

A method of regulating pressure within a first propellant tank of a rocket engine having a first propellant tank containing a first propellant and a second propellant tank containing a second propellant, and a regulator device for regulating pressure within the first tank, the regulator device comprising a gas generator and a heat exchanger co-operating with the gas generator so as to vaporize at least part of the first propellant prior to reintroducing it into the first tank (16), the gas generator and the heat exchanger both being fed with the first propellant by a single first motor-driven pump, while the gas generator is fed with the second propellant by a single second motor-driven pump, wherein the flow rate of the first motor-driven pump is controlled as a function of a first parameter, while the flow rate of the second motor-driven pump is controlled as a function of a second parameter.

8 Claims, 2 Drawing Sheets

(51) Int. Cl.
*F02K 9/42* (2006.01)
*B64G 1/40* (2006.01)
*F02K 9/44* (2006.01)
*F02K 9/46* (2006.01)
*F02K 9/48* (2006.01)
*F02K 9/68* (2006.01)
*F02K 9/94* (2006.01)

(52) U.S. Cl.
CPC ................ *F02K 9/425* (2013.01); *F02K 9/44* (2013.01); *F02K 9/46* (2013.01); *F02K 9/48* (2013.01); *F02K 9/50* (2013.01); *F02K 9/68* (2013.01); *F02K 9/94* (2013.01); *F05D 2270/301* (2013.01); *F05D 2270/303* (2013.01)

(56) References Cited

U.S. PATENT DOCUMENTS

| | | | | |
|---|---|---|---|---|
| 7,762,498 | B1* | 7/2010 | Henderson | B64G 1/401 |
| | | | | 244/171.1 |
| 2014/0203148 | A1* | 7/2014 | Barthoulot | F02K 9/50 |
| | | | | 244/171.1 |

* cited by examiner

METHOD OF REGULATING THE PRESSURE WITHIN A FIRST ROCKET ENGINE PROPELLANT TANK

CROSS-REFERENCE TO RELATED APPLICATION(S)

This patent application claims the benefit of priority under 35 U.S.C. § 119 to French Patent Application No. 1502259, filed on Oct. 26, 2015, the entirety of which is incorporated herein by reference.

FIELD OF THE INVENTION

The present invention relates to a method of regulating the pressure within a first rocket engine propellant tank.

STATE OF THE PRIOR ART

A rocket engine is conventionally an engine in which the gas leaving the combustion chamber is discharged via a nozzle so as to develop thrust. The gas is generally obtained by combustion between a first propellant and a second propellant. By way of example, the first propellant is an oxidizer, such as oxygen, while the second propellant is a fuel, such as hydrogen or methane.

The propellants are stored in tanks in the liquid state, and the tanks are maintained under pressure in order to ensure that propellants flow to the combustion chamber in regular manner. For this purpose, a certain amount of each propellant is taken off from its tank and is passed through a heat exchanger in order to be heated and vaporized therein, prior to being reinjected in the gaseous state into its own tank in order to form a volume of gaseous propellant under pressure in each tank.

Such a rocket engine is generally designed to comply with stages of flight known as "propulsion stages", during which the engine develops thrust suitable for propelling the rocket, and also stages known as "ballistic stages" during which the engine is off, so that the rocket is subjected only to the laws of ballistics.

The first stage of flight is a propulsion stage, during which a large amount of thrust is needed in order to put the rocket into orbit. Thereafter, for orbital maneuvers and for returning to Earth, propulsion stages alternate with ballistic stages, with low levels of thrust that are applied over relatively short periods of time being sufficient.

Nevertheless, it is important for the engine to be capable of restarting quickly and under good conditions at the end of a ballistic stage. This means in particular that even during a ballistic stage, while the engine is not active, sufficient pressure must be ensured in the liquid propellant tanks so that the flow rate needed for restarting the engine can be obtained without waiting. In other words, it is important to vaporize the propellants as bled off and to reinject them into their respective tanks, even during a ballistic stage while the engine is not active. Simultaneously, it is also important to ensure that these propellants are vaporized without significantly degrading the efficiency of the engine during a propulsion stage.

Known devices for regulating pressure in order to regulate pressure within rocket engine propellant tanks are generally complex both in structure and to use, and in particular they involve the presence of a plurality of variable-aperture valves together with means for controlling them. There therefore exists a need for simplification.

SUMMARY OF THE INVENTION

An embodiment provides a method of regulating pressure within a first rocket engine propellant tank, said rocket engine having a first propellant tank containing a first propellant and a second propellant tank containing a second propellant that is different from the first propellant, and a regulator device for regulating pressure within the first tank, the regulator device comprising a gas generator and a heat exchanger (or first heat exchanger) co-operating with the gas generator so as to vaporize at least part of the first propellant prior to reintroducing it into the first tank, the gas generator and the heat exchanger both being fed with the first propellant by a single first variable-flowrate motor-driven pump, while the gas generator is fed with the second propellant by a single second variable-flowrate motor-driven pump, wherein the flow rate of the first motor-driven pump is controlled as a function of a first parameter, while the flow rate of the second motor-driven pump is controlled as a function of a second parameter distinct from the first parameter.

It can thus be understood that the gas generator generates heat by combustion of a mixture of the first and second propellants, at least part of this heat being used by the heat exchanger to vaporize at least part of the first propellant, with this vaporized first propellant (i.e. in gaseous form) then being reinserted into the first tank, thereby enabling the pressure within the first tank to be increased.

It can also be understood that the first motor-driven pump is common to the gas generator and to the heat exchanger. Thus, the flow rate from the first motor-driven pump is shared between the gas generator and the heat exchanger. Naturally, the first motor-driven pump is distinct from the second motor-driven pump.

The inventors have found that by controlling the flow rate of each motor-driven pump independently of the other motor-driven pump, and as a function of parameters that are distinct and not correlated, it is possible to regulate the pressure within the first tank in simple and reliable manner. Naturally, the parameters are parameters that relate to the elements of the regulator device, including the first tank. For example, these parameters may be the propellant flow rate, or the pressure or the temperature at a given point in the regulator device, including in the first tank.

It is thus possible to avoid having the variable-aperture valves of prior art devices for regulating pressure, while conserving only on/off valves for isolating components, where necessary, which valves perform only a safety function and do not perform a regulation function. Such on/off valves are naturally simpler, more reliable, and less expensive than the variable-aperture valves of the prior art.

Furthermore, since pressure is regulated by means of motor-driven pumps, which motor-driven pumps form part of auxiliary circuits, i.e. they do not form part of the circuit for feeding the combustion chamber of the rocket engine, the regulation method can be applied both during propulsion stages and during ballistic stages.

In some embodiments, the first parameter is the pressure within the first tank.

In other words, the regulation method includes a step of measuring the real pressure within the first tank, a step of comparing the real pressure with a predetermined pressure, and a step of controlling the flow rate of the first motor-driven pump as a function of the result of the comparison step so as to reduce the difference between the real pressure and the predetermined pressure. By way of example, the predetermined pressure is the pressure desired within the first tank (i.e. a setpoint pressure).

Thus, in order to increase or decrease the pressure within the first tank, the flow rate of the first motor-driven pump is increased or decreased. Specifically, by increasing or decreasing the flow rate of the first motor-driven pump, the quantity of first propellant that is brought to the heat exchanger is increased or decreased, and thus the volume of the first propellant that is vaporized and reinjected into the first tank is increased or decreased, thereby increasing or decreasing the pressure within the first tank.

In some embodiments, the second parameter is the temperature of the gas generator.

In other words, the regulation method includes a step of measuring the real temperature within the gas generator, a step of comparing the real temperature with a predetermined temperature, and a step of controlling the flow rate of the second motor-driven pump as a function of the result of the comparison step so as to reduce the difference between the real temperature and the predetermined temperature. By way of example, the predetermined temperature is the temperature desired within the gas generator (i.e. a setpoint temperature) in order to ensure that the gas generator operates properly without going out (i.e. to ensure that there is sufficient heat flux to vaporize the propellant within the heat exchanger), while remaining below the maximum acceptable temperature.

The temperature within the gas generator is a function of the mixture ratio between the two propellants, i.e. the flow rate of the first propellant injected into the gas generator divided by the flow rate of the second propellant injected into the gas generator. Furthermore, in normal operation, this ratio is always less than one (1), such that the flow rate of the first propellant is always less than the flow rate of the second propellant. Thus, in order to increase or decrease the temperature of the gas generator, for a given flow rate of the first motor-driven pump, the flow rate of the second motor-driven pump is decreased or increased so as to cause the mixture ratio of the two propellants to tend towards one or away therefrom (i.e. the closer the ratio is to 1, the higher the temperature, and vice versa).

To summarize, the pressure within the first tank and the temperature of the gas generator need to be equal to predetermined values for proper operation of the rocket engine. When the first parameter is the pressure within the first tank and the second parameter is the temperature of the gas generator, controlling the flow rate of the first motor-driven pump serves to adjust the pressure within the first tank, while controlling the flow rate of the second motor-driven pump serves to adjust the flow rate of the second propellant in the gas generator as a function of variation in the flow rate of the first motor-driven pump in order to adjust the pressure within the first tank, so that the temperature within the gas generator remains at the desired value, and thus ensure a continued supply of heat to the heat exchanger. For example, these two parameters constituted by the pressure within the first tank and the temperature of the gas generator are each regulated by respective regulation sub-processes, these two sub-processes being coupled, e.g. by a multivariable corrector.

In some embodiments, the flow rate of the first motor-driven pump is controlled solely as a function of the first parameter, while the flow rate of the second motor-driven pump is controlled solely as a function of the second parameter.

Since these two parameters suffice for regulating the pressure within the first tank, the regulation method and the associated regulation device can be simplified by taking account of these two parameters only.

In some embodiments, regulation of the pressure within the second propellant tank is independent of regulation of the pressure within the first tank.

In other words, the pressure within the second tank is regulated independently of the flow rates of the first and second motor-driven pumps. This ensures that the regulation of one tank is not performed to the detriment of the regulation of the other tank.

In some embodiments, the first propellant and the second propellant are cryogenic liquid propellants.

The method is particularly well adapted to regulating pressure in a first tank containing a cryogenic liquid propellant.

In some embodiments, the first propellant is oxygen and the second propellant is hydrogen or methane.

The method is particularly well adapted to regulating pressure in a first tank that contains oxygen.

An embodiment also concerns a computer program including instructions for executing the pressure regulation method in any one of the embodiments described in the present description when said program is executed by a computer.

An embodiment also provides a computer readable data medium containing the computer program in accordance with any one of the embodiments described in the present description.

The data medium may be any entity or device capable of storing a program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Alternatively, the data medium may be an integrated circuit in which the program is incorporated, the circuit being adapted to execute or to be used in the execution of the method in question.

BRIEF DESCRIPTION OF THE DRAWINGS

The invention and its advantages can be better understood on reading the following detailed description of embodiments of the invention given as non-limiting examples. The description refers to the accompanying sheets of figures, in which.

DETAILED DESCRIPTION OF EMBODIMENTS

Figure 1:
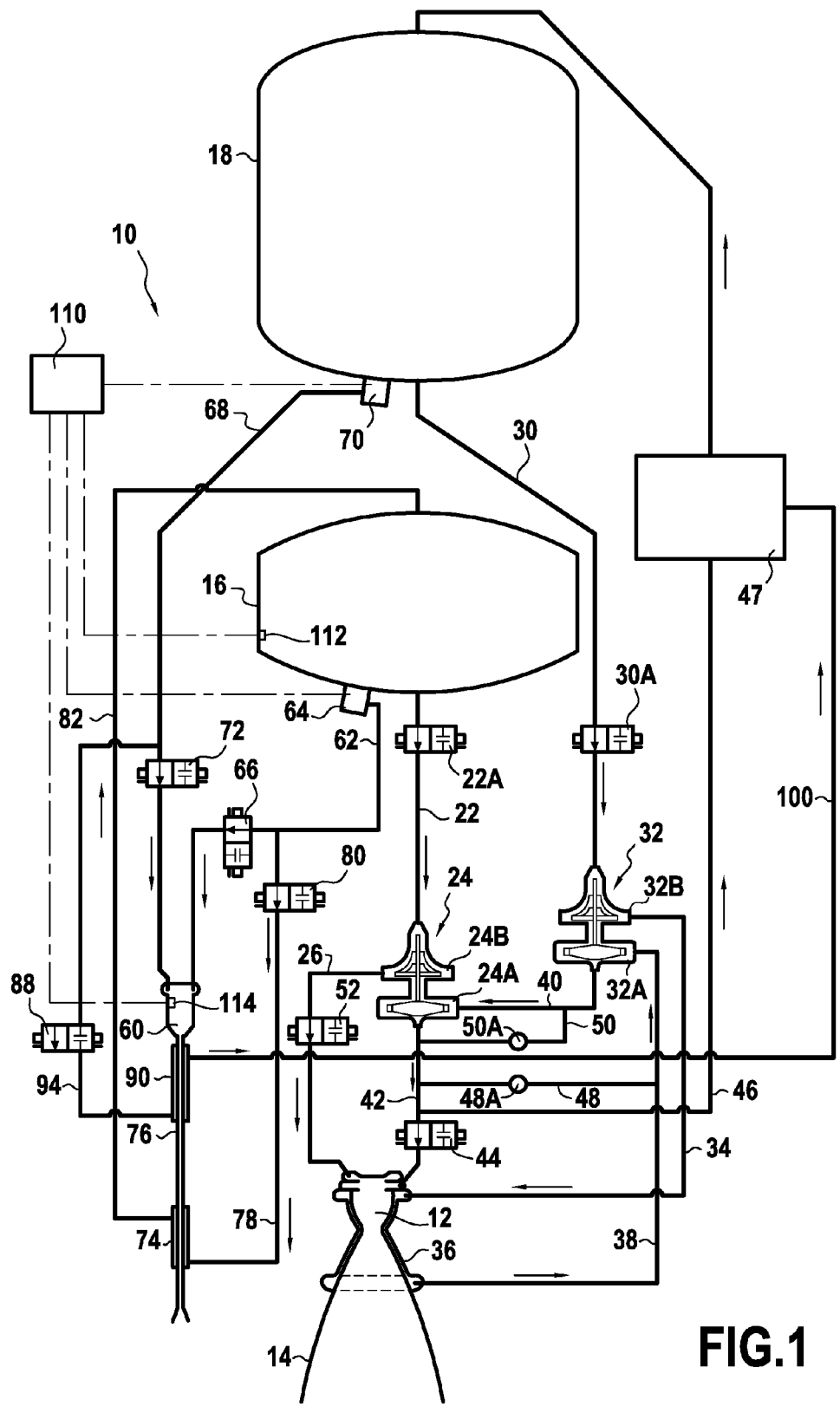
FIG. 1 shows a rocket engine.

FIG. 1 shows a rocket engine 10 having a combustion chamber 12 and a nozzle 14 with a diverging portion. The combustion chamber 12 is fed with a first propellant from a first tank 16 containing the first propellant, e.g. an oxidizer propellant such as oxygen, and it is also fed with a second propellant from a second tank 18 containing the second propellant, e.g. a reducing propellant, e.g. hydrogen or methane. The reducing propellant acts as fuel, which enters into combustion with the oxidizer.

The feed of first propellant from the first tank 16 comprises a main pipe 22 delivering to a first turbopump 24 and a first injection pipe 26 connecting the outlet from the first turbopump 24 to the combustion chamber 12. The feed of second propellant from the second tank 18 comprises a second main feed pipe 30 delivering to a second turbopump 32, and a second injection pipe 34 connected to the outlet of the second turbopump 32.

Respective authorization valves 22A and 30A are arranged in the main feed pipes 22 and 30.

Specifically, the engine 10 is of the "expander" type, i.e. it is an engine in which some of the second propellant is bled off and vaporized in order to deliver energy to certain portions of the engine. More precisely, the second injection pipe 34 delivers to a heater 36 that co-operates with the wall of the combustion chamber 12 so that during a propulsion stage the second propellant flowing through the heater is heated so as to be vaporized. At the outlet from the heater 36, the second propellant is brought by a feed pipe 38 to the turbine portion 32A of the second turbopump 32 in order to drive its turbine and actuate its pump portion 32B. At the outlet from the turbine portion 32A, the second propellant is brought by a delivery pipe 40 to the inlet of the turbine portion 24A of the first turbopump 24 in order to drive its turbine so as to actuate its pump portion 24B. At the outlet from the turbine portion 24A, the second propellant is brought to the inlet of the combustion chamber 12 by an injection pipe 42. An isolation valve 44 is arranged on the injection pipe 42, which is connected to the second tank 18 via a system of pressurizing and expansion valves 47. Thus, the vaporized second propellant returns to the tank 18 where it forms a volume of gas as a pressure that can be regulated by the system 47.

Thus, the rocket engine 10 has a regenerative heat exchange circuit that uses the heat of combustion from the combustion chamber 12 to vaporize the second propellant. This regenerative heat exchange circuit comprises the heater 36 and the pipes 38, 40, 42, and 46. A bypass pipe 48 having a variable-aperture valve 48A is arranged between the pipes 38 and 42 to bypass the inlets of the turbines. Another bypass pipe 50 with a variable-aperture valve 50A is arranged between the outlet of the turbine portion of the second turbopump 32 and the injection pipe 42 in order to bypass the turbine portion 42A of the first turbopump 24.

The first propellant is injected into the combustion chamber 12 directly by the injection pipe 26, which extends between the outlet of the first turbopump 26 and the inlet of the combustion chamber 12. An isolation valve 52 is arranged on the pipe 26 to authorize the injection flow or to stop it.

The rocket engine 10 has a device for regulating pressure within the first tank 16, which device comprises a gas generator 60 and a first heat exchanger 74 that co-operates with the gas generator 60. A single first motor-driven pump 64 of variable flow rate feeds the gas generator 60 and the first heat exchanger 74 with the first propellant. A single second motor-driven pump 70 of variable flow rate feeds the gas generator 60 with the second propellant. The gas generator 60 also co-operates with a second heat exchanger 90 that is distinct from and independent of the first heat exchanger 74, and that is likewise fed by the second motor-driven pump 70 with the second propellant, in this example.

The gas generator 60 is fed with the first propellant by a first feed pipe 62 connected to the first tank 16 by the first variable-flowrate first motor-driven pump 64. A first feed valve 66 is arranged on the first feed pipe 62. The gas generator 60 is fed with the second propellant by a second feed pipe 68 connected to the second tank 18 by the second variable-flowrate motor-driven pump 70. A second feed valve 72 is arranged on the second feed pipe 68. It should be observed that the feed pipes 62 and 68 connecting the tank to the gas generator 60 form pipes that are auxiliary in comparison with the main feed pipes 22 and 30.

The first heat exchanger 74 co-operates with the gas generator 60 to vaporize at least part of the first propellant, the first propellant being fed thereto via the first motor-driven pump 64. By way of example, this first heat exchanger 74 may be formed by a double-walled tube that co-operates with the exhaust 76 from the gas generator 60, and in which the first propellant can flow. For this purpose, the first heat exchanger 74 may be fed by a first branch pipe 78 connected to the first feed pipe 62. Specifically, this connection is made upstream from the first feed valve 66. Specifically, the first branch pipe 78 is connected to the first feed pipe 62 by a branch valve 80 that may be opened or closed to authorize or prevent the first heat exchanger 74 being fed with the first propellant. The outlet from the first heat exchanger 74 is connected to the first tank 16 by a first return pipe 82 so that the first propellant vaporized in the first heat exchanger 74 is fed to the gas space in the first tank 16.

The second heat exchanger 90 co-operates with the gas generator 60 to vaporize at least part of the second propellant, with the second propellant being fed by the second motor-driven pump. For example, the second heat exchanger 90 may comprise a double-walled tube around the exhaust 76 from the gas generator 60. This second heat exchanger 90 may be fed with the second propellant by a second branch pipe 94 connected to the second feed pipe 68. Specifically, this connection is made upstream from the second feed valve 72. Specifically, the second branch pipe 94 is connected to the second feed pipe 68 by a branch valve 88 that may be opened or closed to authorize or prevent the second heat exchanger being fed with the second propellant. The outlet from the second heat exchanger 90 is connected to the second tank 18 by a return pipe 100 such that the second propellant vaporized in the second heat exchanger 90 can be reinjected into the gas space of the second tank 18 via the valve system 47.

In FIG. 1, arrows show the flow directions of the propellants in the hydraulic circuits. FIG. 1 shows a state in which the rocket engine 10 is in operation (a propulsion stage), i.e. a stage in which combustion is taking place in the combustion chamber 12, so that the pressure in the second tank 18 is regulated in conventional manner by the system 47, with the valve 88 being closed. When the rocket engine 10 is not operating (a ballistic stage), i.e. a stage in which no combustion is taking place in the combustion chamber 12, the valve 88 is open so that the pressure in the second tank is regulated in known manner using the second heat exchanger 90 and the system 47.

In this example, in order to regulate the pressure within the first tank 16, the rocket engine 10 also has a control unit 110 connected to a pressure sensor 112 to measure the pressure within the first tank 16, and to a temperature sensor 114 to measure the temperature within the gas generator 60. The control unit 110 is also connected to the first and second motor-driven pumps 64 and 70 in order to control their respective flow rates. It should be observed that the connections with the control unit 110 are drawn in chain-dotted lines in order to distinguish them from the above-described propellant circuits.

Figure 2:
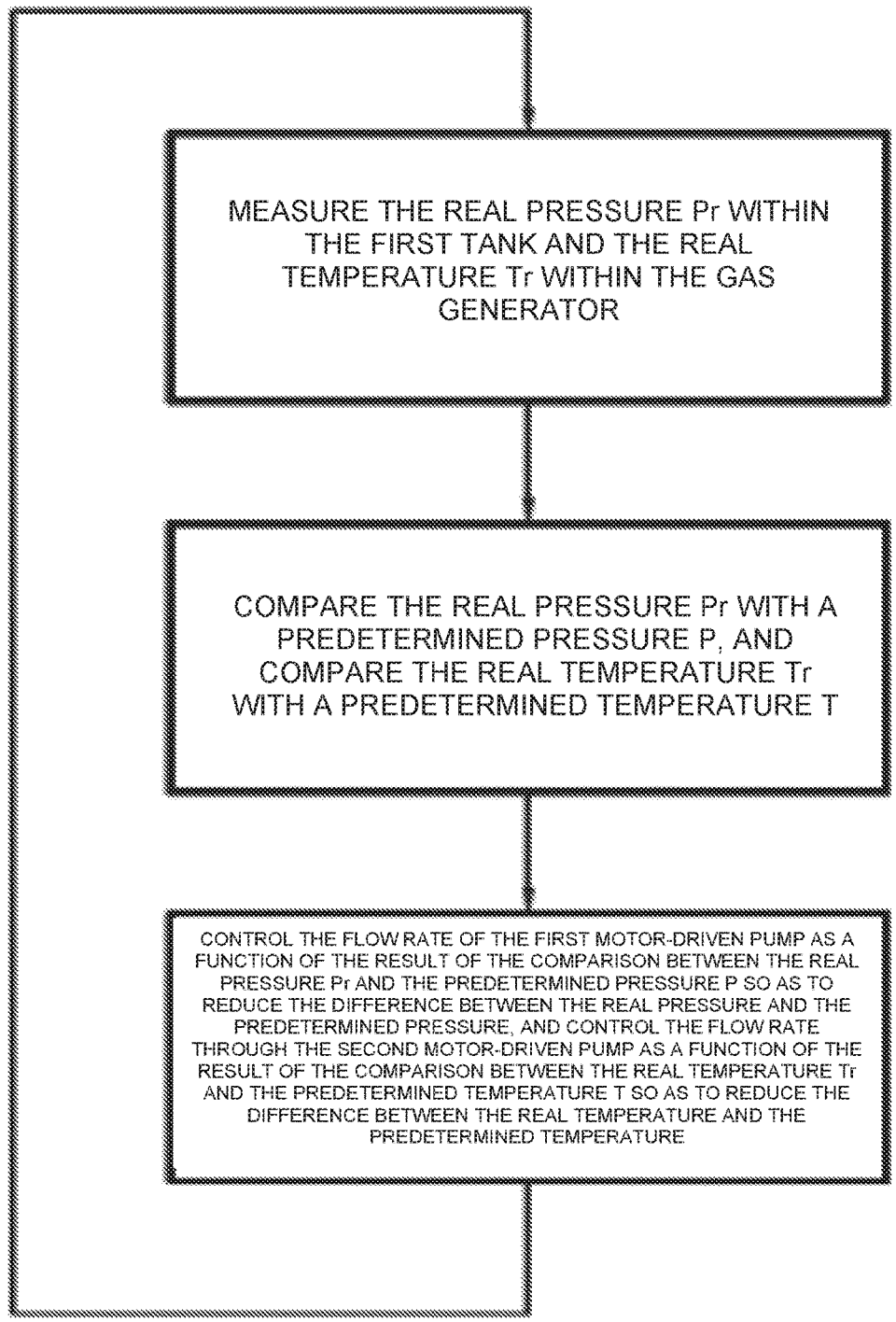
FIG. 2 shows the various steps in a method of regulating the pressure within the first tank of the FIG. 1 rocket engine.

The method of regulating the pressure within the first tank 16 is described below with reference to FIG. 2.

During a step I, the real pressure $Pr$ within the first tank 16 and the real temperature $Tr$ within the gas generator 60 are measured. During a step II, the real pressure $Pr$ is compared with a predetermined pressure $P$ and the real temperature Tr is compared with a predetermined temperature T. During a step III, the flow rate of the first motor-driven pump 64 is controlled as a function of the result of the comparison between the real pressure Pr and the predetermined pressure P so as to reduce the difference between the real pressure and the predetermined pressure, while the flow rate through the second motor-driven pump 70 is controlled as a function of the result of the comparison between the real temperature Tr and the predetermined temperature T so as to reduce the difference between the real temperature and the predetermined temperature. In this example, the control unit 110 performs the various steps of the method. Thus, by controlling the flow rate of each of the motor-driven pumps 64 and 70, the pressure within the first tank 16 is regulated on an ongoing basis, i.e. while ensuring proper operation of the gas generator 60. Naturally, when step III is terminated, the method restarts from step I in order to provide continuous regulation of the pressure within the first tank.

Naturally, the actions of measuring and comparing the real pressure within the first tank with the predetermined pressure, and of measuring and comparing the real temperature within the gas generator with the predetermined temperature can be performed simultaneously or sequentially, or else they may be performed in parallel within two independent sub-processes that may be independent or coupled. Likewise, the first and second motor-driven pumps may be controlled simultaneously or sequentially, or indeed in parallel within two sub-processes that are independent or coupled.

Although the present invention is described with reference to specific embodiments, it is clear that modifications and changes may be undertaken in those embodiments without going beyond the general ambit of the invention as defined by the claims. In particular, the individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed, singly or in combination, to a device, and vice versa, all of the characteristics described with reference to a device can be transposed singly or in combination to a method.

The invention claimed is:

1. A regulation method for regulating pressure within a first rocket engine propellant tank a first propellant tank of a rocket engine, said rocket engine having a first propellant tank containing a first propellant and a second propellant tank containing a second propellant that is different from the first propellant, wherein the first and second propellants are provided to a combustion chamber of said rocket engine, and a regulator device for regulating pressure within the first propellant tank, the regulator device comprising a gas generator and a heat exchanger cooperating with the gas generator so as to vaporize at least part of the first propellant prior to reintroducing it into the first propellant tank, the gas generator and the heat exchanger both being fed with the first propellant by a single first variable-flowrate motor-driven pump, while the gas generator is fed with the second propellant in liquid form by a single second variable-flowrate motor-driven pump, wherein the flow rate of the first motor-driven pump is controlled as a function of a first parameter, while the flow rate of the second motor-driven pump is controlled as a function of a second parameter distinct from the first parameter.

2. A regulation method according to claim 1, wherein the first parameter is the pressure within the first propellant tank.

3. A regulation method according to claim 1, wherein the second parameter is a temperature of the gas generator.

4. A regulation method according to claim 1, wherein the flow rate of the first motor-driven pump is controlled solely as a function of the first parameter, while the flow rate of the second motor-driven pump is controlled solely as a function of the second parameter.

5. A regulation method according to claim 1, wherein the first propellant and the second propellant are cryogenic liquid propellants.

6. A regulation method according to claim 1, wherein the first propellant is oxygen and the second propellant is hydrogen or methane.

7. A computer program including instructions for executing the pressure regulation method according to claim 1 when said program is executed by a computer.

8. A computer readable data medium containing the computer program of claim 7.

* * * * *